June 18, 1929. F. J. SCHLEICHER Re. 17,328

PAPER BOX

Original Filed Aug. 10, 1925

Inventor:
Frank J. Schleicher,
by Pippey & Kingsland,
His Attorneys.

Reissued June 18, 1929. Re. 17,328

UNITED STATES PATENT OFFICE.

FRANK J. SCHLEICHER, OF UNIVERSITY CITY, MISSOURI.

PAPER BOX.

Original No. 1,641,012, dated August 30, 1927, Serial No. 49,434, filed August 10, 1925. Application for reissue filed April 6, 1928. Serial No. 353,235.

This invention relates to boxes and has special reference to boxes made of cardboard or other appropriate material of sufficient stiffness to retain a desired shape and having an outside base member with cut or raw edge and held in connection with the bottom independently of the side wall.

An object of the invention is to provide a box having its side walls held in connection with the bottom in combination with a cardboard base having a cut edge and held in connection with the bottom by means other than the means holding the side wall in connection with the bottom.

Another object of the invention is to provide an improved box of approximate heart shape and having the side walls connected with the bottom and top respectively of the box; in combination with a base and a top covering portion secured to the bottom and to the top respectively and by fastening means applied after the connection of the side walls to said bottom and top and having their marginal edges extending beyond the side walls of the bottom and the top so as to shield and guard the connections of the side walls with the bottom and top of the box, said base and said top covering portion being attached to the bottom and top of the box respectively by means other than the means connecting the side walls of the bottom and top of the box respectively.

Another object of my invention is to provide a box of novel and improved construction which may be manufactured largely by machinery so as to eliminate objectional conditions of hitherto costly hand manufacture. This specific object may be obtained by providing a connection uniting the side walls with the bottom and top of the box respectively, which connection is different or separate from the means uniting the base and top covering portion with the bottom and top of the box respectively.

Another object of the invention is to provide a box of the type and of the character mentioned wherein the ends of the side walls are secured together by means other than the means uniting the side walls with the bottom and with the top of the box respectively.

Other objects will appear from the following description, reference being made to the drawings in which Fig. 1 shows a blank from which the box may be made, the scoring and bending lines being indicated by lines composed of dots and dashes.

Figure 1:
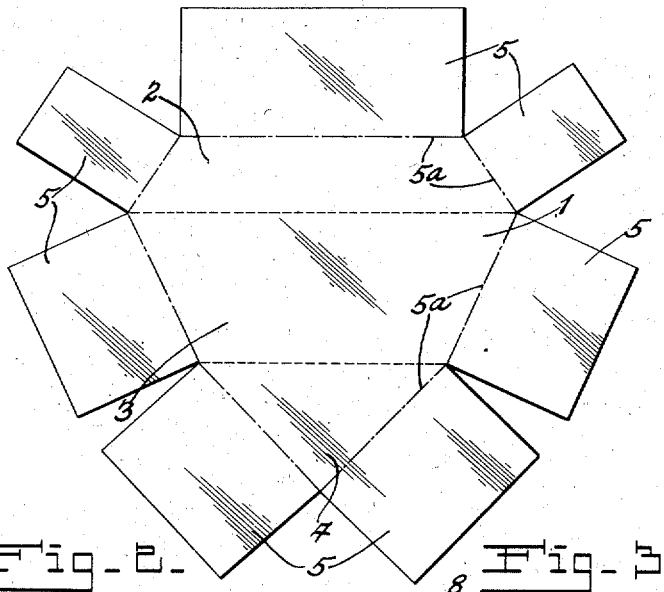
Figure 2:
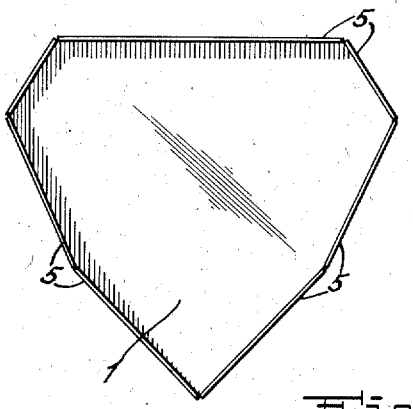
Fig. 2 is a top plan view of the box with the side wall forming portions bent into their proper position, but without the means for connecting the ends thereof.
Figure 3:
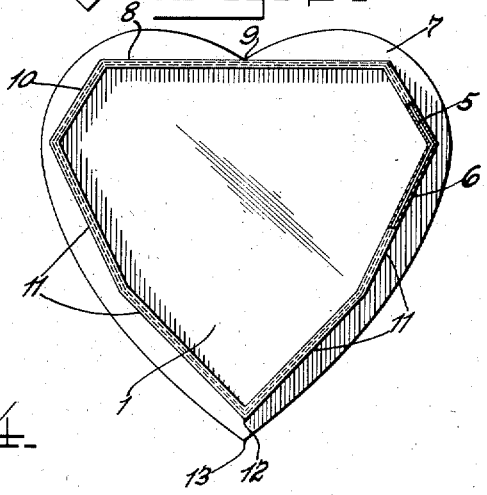
Fig. 3 is a top plan view of the completed box.

The blank illustrated in Fig. 1 consists of a body portion 1 approximately heart-shaped in outline. This body portion 1 comprises a rear portion 2, the ends of side edges of which converge rearwardly and which extends the full width of the box. Additionally the body portion 1 comprises a middle portion 3, the side edges of which converge forwardly from intersection with the side edges of the rear portion 2 and which intersect the forwardly converging side edges of the front portion 4 which is in the shape of a triangle. The side edges of each portion of the body 1 are formed integral with rectangular wall-forming tabs 5, the width of which is equal to the length of the respective side edges with which said tabs are integrally united. Each of the tabs 5 is of uniform width throughout its length so that when said tabs are turned perpendicularly to the body comprising the portions 2, 3 and 4 the side edges of said tabs are in abutting contact, as clearly shown in Fig. 2 of the drawing. These tabs 5, as stated in the brief description of Fig. 1 of the drawing, are defined from the portions 2, 3 and 4, with which they are respectively united, by score lines $5^a$. The score lines $5^a$ defining the respective tabs 5 intersect the score lines $5^a$ for the adjacent tabs at the points of union of the tabs with the body portion 1 and it is along these score lines that the tabs 5 are folded so as to bring their side edges into abutting contact or into close relationship.

According to this form of the invention the side wall of the box is formed integral with the bottom of the box. It is apparent that the means uniting the side wall with the bottom of the box is different from the means by which the base is secured to the under side of the bottom of the box; and, since the lid of the box is similarly constructed, it is apparent that the means uniting the side wall with the top of the box is different from the means uniting the cover portion of the box with the top. Further, according to this invention and in the broadest sense, the side wall of the box has permanent connection with the bottom of the box before the base is applied. As herein specifically shown the permanent connection between the side wall and the bottom of the box is obtained by forming the side wall integral with the box. So, too, in the lid of the box permanent connection between the side wall and the top is obtained before the cover portion of the lid is applied by forming the side wall of the lid in the same piece, that is to say, integral with the top of the lid. The invention in this respect, however, may be varied without departure from the principle thereof.

A permanent connection between the side wall and the bottom of the box having been provided and the ends of the side wall being in abutting contact or close to each other, a permanent attachment between the ends of the side wall is provided to hold the side wall permanently in proper adjustment. As shown, a continuous strip of paper 6 is folded to enclose the side wall of the box. This strip 6 crosses the abutting ends of the tabs 5 and has its ends out of alinement with any of the ends of the tabs 5. This strip of paper 6 completes the wall and is adhesively secured to the inner and outer sides. Accordingly, after the strip of paper 6 is applied and is attached to the inner and outer sides of the wall, it is impossible for the wall sections comprising the tabs 5 to separate or to fold outwardly.

A base 7 is then attached to the outside surface of the box bottom 1 and it will be noted that the marginal portion of the base 7 projects beyond the side wall of the box and thereby guards and shields the connection between the side wall and the bottom of the box. Further, the base 7 is held in connection with the box by means other than the means holding the side wall in connection with the bottom of the box.

In the specific type of box described the rear portion consists of a straight wall 8 extending in a straight line from a point on the upper outer marginal portion of one lobe of the curved base 7 past the rear intersection 9 of the base lobes at the center of the base to a point on the upper marginal portion of the other lobe. Relatively short side wall sections 10 extend from the ends of the portion 8 outwardly and forwardly, and longer side wall sections 11 extend forwardly and inwardly from the ends of the sections 10 and are joined at 12 in a forwardly directed box point adjacent to but spaced from the lower intersection of the side edges of the lobes of the base 7. Thus, the marginal portion of the base 7 projects beyond the side wall of the box throughout the circumference of the box and functions not only as an ornamental feature, but also has utility in shielding and guarding the connection of the side wall of the box with the bottom. Moreover, since the base is united with the bottom, it is possible to use different fastening means, thus greatly reducing the cost and time required to produce this box in quantities.

In completing the box of my present invention the operation is greatly expedited and facilitated and the cost is largely reduced because of the novel features of construction and relationship of parts. In the specific embodiment of the invention shown the intersection 9 of the edges of the lobes constitutes a defined point that is to be located midway of the sides of the box; and the sharp point 13 of the base is diametrically opposite from the defined point 9 and is to be located directly and in a straight line in front of the box point 12. Thus by locating the base 7 in a position in which the defined point 9 is midway between the sides of the box, that is to say midway between the ends of the wall 8, and in which the sharp point 13 is directly in front of and in line with the box point 12 a relationship and adjustment is obtained in which the marginal edges of the base 7 at similar opposite points are equidistant from the side wall of the box. The attachment of the base 7 to the box in this way may be obtained much easier and faster than is possible in constructions whereby the base is secured to the box by the same fastening means that unites the side wall to the bottom of the box. In large quantities this saving is great so that it is apparent that I have produced a box of novel construction comprising novel features arranged in a new relationship whereby many advantages and savings are obtained.

The base 7 being of cardboard is, of course, cut to the proper shape and, since said base is attached to the box by means other than the means holding the wall 5 in connection with the bottom of the box, the edges of the base 7 remain uncovered. By using cardboard of appropriate quality no covering is needed for the edge. The necessity of covering the edge to obtain proper ornamental effect and finish is eliminated because of the omission of the usual attaching strip for securing the base to the side wall of the box. That is to say, the line of connection around the bottom of the box and between the base and the bottom and side wall of the box is uncovered. Heretofore it has been usual to unite these parts by attaching strip running along the joint or corner, and to obtain proper finish the edge of the base has been covered or enclosed. By my improved box constructed as described, this item of expense is eliminated and the operation of manufacture is facilitated and expedited and the cost thereof largely reduced.

Figure 4:
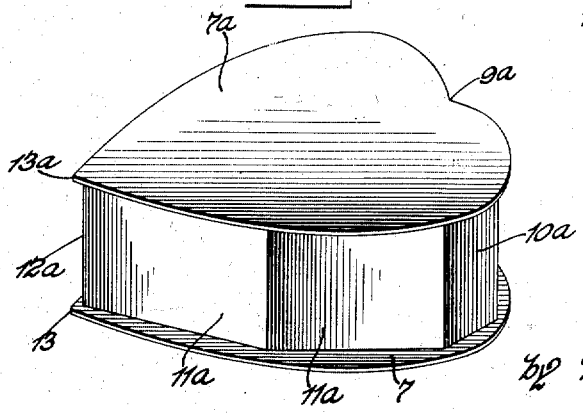
Fig. 4 is a perspective view of a box with a similarly made lid assembled therewith.

In Fig. 4 the lid is shown applied to the box and provided with a covering portion $7^a$ corresponding to the base 7; a defined point $9^a$ corresponding to the defined point 9; short side wall sections $10^a$ corresponding to the short side wall sections 10; longer side wall sections $11^a$ corresponding to the side wall sections 11; a point $12^a$ corresponding to the box point 12; and a sharp point $13^a$ corresponding to the sharp point 13, all of which features have been described above.

The construction and arrangement of the parts may be varied within equivalent limits without departure from the nature and principle thereof. The form and shape of the box may be varied as desired. I contemplate such and other variations as may be found desirable or expedient in the manufacture of the box.

I claim:—

1. In a box, a bottom, a side wall extending perpendicularly from said bottom and forming an enclosure and having a point toward one side of the box and having its ends close to each other, a strip adhesively united to the outer side of said side wall and crossing said ends and holding said ends from separating, and a base detached from said strip and attached to the outer side of said bottom wall by means other than the means holding said side wall in connection with said bottom wall and other than said strip and having its marginal edge projecting beyond the line of connection of said side wall with said bottom wall and guarding and shielding said connection; said base having a sharp point at one edge whereby location of said base in position in which said sharp point is in alinement with said box point essentially obtains a balanced adjustment of said base against said bottom in the position aforesaid.

2. In a box, a bottom, a side wall in connection with the edge of said bottom and extending perpendicularly therefrom and forming an enclosure and having a point toward one side of the box and having its ends close to each other, a folded strip enclosing said side wall between its folds and secured to the inner and outer surfaces of said side wall and crossing said ends and holding said ends from separating, and a base detached from said strip and attached to the outer side of said bottom wall independently of the means securing said side wall in connection with said bottom wall and independently of said strip and having its marginal edge projecting beyond said side wall and guarding and shielding the connection of said side wall with said bottom; said base having a sharp point at one edge whereby location of said base in position in which said sharp point is in alinement with said box point essentially obtains a balanced adjustment of said base against said bottom in the position aforesaid.

3. In a box, a base with a curved heart-shaped contour, a bottom sheet mounted thereon, side walls integral with said sheet and comprising a straight rear portion slightly shorter than the greatest width of the box, relatively short straight portions at the end of said rear portion and extending outwardly and forwardly therefrom, and straight portions at the ends of said relatively short portions and extending inwardly and forwardly therefrom to unite in a forwardly directed point.

4. In a cardboard box, a base sheet with a heart-shaped curved contour, a bottom sheet mounted on said base and including integral elements bent upwardly to form a rear wall extending in a straight line between points near the upper outer edges of the respective lobes of said base sheet and past the upper intersection of said lobes, and side walls each extending in straight lines downwardly and outwardly and then forwardly and inwardly toward the lower intersection of said lobes.

5. In a cardboard box, an inner bottom element with a plurality of straight side walls formed integrally therewith and bent upwardly and disposed in a general heart-shaped arrangement about the edges of said element, and another bottom element having a heart-shaped curved contour circumscribing the lower edges of said walls and attached to said inner bottom element.

6. In a box, a bottom, a side wall extending perpendicularly from said bottom and forming an enclosure having a point toward one side of the box and having its ends close to each other, means fastening together the ends of said wall, and a base attached to the outer side of said bottom by means other than the means holding said side wall in connection with said bottom and having a defined point in one edge and a sharp point at the other edge, whereby location of said base in relationship in which said defined point is adjacent to and midway of the sides of the enclosure and in which said sharp point is in alinement with said box essentially obtains a balanced adjustment of said base in which corresponding parts of its edges project uniformly beyond said side wall at all sides thereof.

7. In a box, a bottom, a side wall extending perpendicularly from said bottom and forming an enclosure having a point toward one side of the box, and a base attached to the outer side of said bottom by means other than the means holding said side wall in connection with said bottom and having a defined point in one edge and a sharp point at the other edge, whereby location of said base in relationship in which said defined point is adjacent to and midway of the sides of the enclosure and in which said sharp point is in alinement with said sharp point of said box essentially obtains a balanced adjustment of said base in which corresponding parts of its edges project uniformly beyond said side wall at all sides thereof.

8. In a box, a bottom, a side wall extending perpendicularly from said bottom and forming an enclosure and having a point toward one side of the box and having its ends unlapped and close to each other, a strip adhesively united to the outer side of said side wall and crossing said ends and holding said ends from separating and being wholly above the under side of said bottom, and a cut edge base unattached to said stirp and attached to the outer side of said bottom and having its marginal edges projecting beyond said side wall and uncovered and having its cut edge exposed; said base having a sharp point at one edge whereby location of said base in position in which said sharp point is in alinement with said box point essentially obtains a balanced adjustment of said base against said bottom in the position aforesaid.

9. In a box, a bottom, a side wall extending upwardly from said bottom and forming an enclosure and having a point toward one side of the box and having its ends unlapped and adjacent to each other, a strip attached to and covering the outer side of said side wall and crossing said ends and holding said ends from separating and being wholly above the under side of said bottom, and a cut edge base unattached to said strip and attached to the outer side of said wall and being wholly below said strip and having its marginal edges projecting beyond said side wall and exposed on the upper side; said base having a sharp point at one edge whereby location of said base in position in which said sharp point is in alinement with said box point essentially obtains a balanced adjustment of said base against said bottom in the position aforesaid.

FRANK J. SCHLEICHER.